United States Patent
Jo et al.

(10) Patent No.: US 10,581,063 B2
(45) Date of Patent: Mar. 3, 2020

(54) POSITIVE ELECTRODE ACTIVE MATERIAL FOR SECONDARY BATTERY, POSITIVE ELECTRODE FOR SECONDARY BATTERY INCLUDING SAME, AND SECONDARY BATTERY

(71) Applicant: LG Chem, Ltd., Seoul (KR)

(72) Inventors: Chi Ho Jo, Daejeon (KR); Sin Young Park, Daejeon (KR); Wang Mo Jung, Daejeon (KR); Byung Chun Park, Daejeon (KR); So Ra Baek, Daejeon (KR)

(73) Assignee: LG Chem, Ltd. (KR)

( * ) Notice: Subject to any disclaimer, the term of this patent is extended or adjusted under 35 U.S.C. 154(b) by 112 days.

(21) Appl. No.: 15/553,319

(22) PCT Filed: Nov. 24, 2016

(86) PCT No.: PCT/KR2016/013577
§ 371 (c)(1),
(2) Date: Aug. 24, 2017

(87) PCT Pub. No.: WO2017/095068
PCT Pub. Date: Jun. 8, 2017

(65) Prior Publication Data
US 2018/0047974 A1    Feb. 15, 2018

(30) Foreign Application Priority Data

Nov. 30, 2015 (KR) ........................ 10-2015-0169181

(51) Int. Cl.
| | |
|---|---|
| *H01M 4/131* | (2010.01) |
| *H01M 4/525* | (2010.01) |
| *H01M 10/052* | (2010.01) |
| *H01M 4/36* | (2006.01) |
| *H01M 4/1391* | (2010.01) |
| *H01M 4/62* | (2006.01) |
| *H01M 4/505* | (2010.01) |
| *H01M 4/04* | (2006.01) |
| *H01M 4/02* | (2006.01) |

(52) U.S. Cl.
CPC ......... *H01M 4/131* (2013.01); *H01M 4/0402* (2013.01); *H01M 4/1391* (2013.01); *H01M 4/366* (2013.01); *H01M 4/505* (2013.01); *H01M 4/525* (2013.01); *H01M 4/622* (2013.01); *H01M 10/052* (2013.01); *H01M 2004/021* (2013.01); *H01M 2004/028* (2013.01); *Y02T 10/7011* (2013.01)

(58) Field of Classification Search
CPC .. H01M 4/131; H01M 4/0402; H01M 4/1391; H01M 4/366; H01M 4/505; H01M 4/525; H01M 4/622; H10M 10/052
See application file for complete search history.

(56) References Cited

U.S. PATENT DOCUMENTS

| | | | |
|---|---|---|---|
| 2007/0122694 A1 | 5/2007 | Yamaki et al. | |
| 2009/0068561 A1 | 3/2009 | Sun et al. | |
| 2014/0000100 A1 | 1/2014 | Oh et al. | |
| 2014/0212944 A1 | 7/2014 | Tian et al. | |
| 2015/0188144 A1* | 7/2015 | Shin ................... | H01M 4/0402 429/212 |
| 2016/0260979 A1 | 9/2016 | Park et al. | |

FOREIGN PATENT DOCUMENTS

| | | | |
|---|---|---|---|
| JP | 2002216744 A | 8/2002 | |
| JP | 2007134279 A | 5/2007 | |
| JP | 2009525578 A | 7/2009 | |
| JP | 2014510372 A | 4/2014 | |
| JP | 2014191904 A | 10/2014 | |
| JP | 2015105275 A | 6/2015 | |
| KR | 20050083869 A | 8/2005 | |
| KR | 20090013841 A | 2/2009 | |
| KR | 20150057990 A | 5/2015 | |
| KR | 20150078432 A | 7/2015 | |
| WO | WO-2015119887 A1 * | 8/2015 | ............ H01M 4/134 |

OTHER PUBLICATIONS

Search report from International Application No. PCT/KR2016/013577, dated Feb. 22, 2017.
Wang, Liping, et al., "Dicarboxylate CaC8H4O4 as a High-performance Anode for Li-ion Batteries." Nano Research, 2015, vol. 8, No. 2, pp. 523-532.

* cited by examiner

*Primary Examiner* — Jimmy Vo
(74) *Attorney, Agent, or Firm* — Lerner, David, Littenberg, Krumholz & Mentlik, LLP

(57) ABSTRACT

In the present invention is provided a positive electrode active material for a secondary battery, wherein the positive electrode active material includes a core including a lithium composite metal oxide, and a surface treatment layer positioned on the surface of the core, and the surface treatment layer includes a porous coordination polymer in which a central metal ion is coordinate-bonded with an organic ligand such that high electrode density may be exhibited when an electrode is manufactured, and consequently, battery properties may be significantly enhanced. Also provided are a positive electrode, which is for a secondary battery and includes the positive electrode active material, and a secondary battery.

26 Claims, No Drawings

POSITIVE ELECTRODE ACTIVE MATERIAL FOR SECONDARY BATTERY, POSITIVE ELECTRODE FOR SECONDARY BATTERY INCLUDING SAME, AND SECONDARY BATTERY

CROSS REFERENCE TO RELATED APPLICATION

The present application is a national phase entry under 35 U.S.C. § 371 of the International Application No. PCT/KR2016/013577 filed Nov. 24, 2016, which claims priority from Korean Patent Application No. 10-2015-0169181, filed on Nov. 30, 2015, all of which are hereby incorporated herein by reference.

TECHNICAL FIELD

The present invention relates to a positive electrode active material for a secondary battery, the positive electrode active material exhibiting a high electrode density and being capable, when utilized in a battery, of exhibiting excellent lifetime properties and high-temperature stability, to a positive electrode which is for a secondary battery and includes the same, and to a secondary battery.

BACKGROUND ART

Increases in technological development and demand for mobile devices have resulted in a sharp increase in the demand for secondary batteries as an energy source. Among such secondary batteries, lithium secondary batteries, which have a high energy density and voltage, a long cycle life, and a low self-discharge rate, have been commercialized and are in wide use. However, such lithium secondary batteries have the limitation wherein repeated charging and discharging leads to a rapid decrease in lifetime. In particular, such limitations are more severe at high temperatures. The reason for this is that moisture inside the battery or other effects cause electrolytes to dissociate or active materials to degrade, and such is due to a phenomenon that occurs as a result of increased internal resistance in the battery.

Therefore, a positive electrode active material for lithium secondary batteries currently under active development is $LiCoO_2$ having a layered structure. $LiCoO_2$ is the most widely used due to having excellent lifetime properties and charge-discharge efficiency, but has low structural stability and thus has limits with respect to application in techniques for increasing battery capacity.

Various lithium transition metal oxides have been developed as positive electrode active materials for replacing $LiCoO_2$, such as $LiMnO_2$ and $Li_2MnO_3$ having layered structures, $LiMn_2O_4$, $LiNiO_2$, and $LiFePO_4$ having spinel structures, or $Li(Ni_xCo_yMn_z)O_2$ and the like.

Among these, lithium manganese oxides such as $LiMnO_2$, $Li_2MnO_3$, and $LiMn_2O_4$ have the advantages of excellent thermal stability and low cost, but have the limitations of low capacity, and poor high-temperature properties.

Therefore, research on nickel-based positive electrode active materials having discharge capacities which are at least 20% higher than cobalt-based positive electrode active materials is actively being carried out. $LiNiO_2$ is similar to $LiCoO_2$ in having a layered structure and has an initial discharge capacity of 180-200 mAh/g, but due to being structurally unstable—transforming from a monoclinic structure to a hexagonal structure during charging and discharging—rapidly decreases in capacity when continuous charging and discharging are performed, has low thermal stability and poor cycle properties, and has the disadvantage in which quantitatively stoichiometric material synthesis is difficult. In order to overcome such limitations, there have been attempts to achieve structural stability by adding cobalt to $LiNiO_2$, but here, the amount of the cobalt added must be at least 30 mol %, and thus there was a limitation of causing a relative decrease in capacity.

Due to such circumstances, the materials receiving the most attention as replacement positive electrode active materials for $LiCoO_2$ are lithium nickel manganese cobalt oxides, that is, $Li(Ni_xCo_yMn_z)O_2$ (here, x, y, and z are each independently the atomic fractions of elements forming the oxide, where $0<x\leq1$, $0<y\leq1$, $0<z\leq1$, and $0<x+y+z\leq1$). This material is less expensive than $LiCoO_2$ and has the advantage in being able to be used for high capacities and high voltages, but has the disadvantages of poor rate capability and poor high-temperature lifetime properties.

In order to overcome such limitations, a method for manufacturing a lithium transition metal oxide having a concentration gradient in metal composition has been proposed, wherein, after preparing a double layer by synthesizing a core material and then coating the outside thereof with a material of a different composition, the double layer is mixed with a lithium salt and heat treated to manufacture the lithium transition metal oxide. In this method, although the core and an external layer may be synthesized to have different metal compositions when synthesized, a continuous concentration gradient of the metal composition is insufficiently formed in the manufactured positive electrode active material. Thus, the improvement effect in terms of output properties is unsatisfactory, and there is a limitation of low reproducibility.

DISCLOSURE OF THE INVENTION

Technical Problem

A first technical objective of the present invention is to provide a positive electrode active material which is for a secondary battery and exhibits a high electrode density, and when utilized in a battery, can exhibit excellent lifetime properties and high-temperature stability, and to provide a method for manufacturing the same.

A second technical objective of the present invention is to provide a positive electrode including the positive electrode active material.

A third technical objective of the present invention is to provide a lithium secondary battery including the positive electrode, a battery module, and a battery pack.

Technical Solution

In order to achieve the above objectives, according to an embodiment of the present invention, a positive electrode active material for a secondary battery is provided, the positive electrode active material including a core including a lithium composite metal oxide; and a surface treatment layer positioned on the surface of the core, wherein the surface treatment layer includes a porous coordination polymer in which a central metal ion is coordinate-bonded with an organic ligand.

Moreover, according to another embodiment of the present invention, a method for preparing the positive electrode active material for a secondary battery is provided, the method including a step for forming a surface treatment layer on the surface of a core by mixing and then heat treating a core, which includes a lithium composite metal oxide, with a porous coordination polymer compound; or a step for forming the surface treatment layer on the surface of the core through self-assembly of a ligand compound and a metal raw material, following mixing of the core with the ligand compound and the metal raw material in a solvent.

Furthermore, according to another embodiment of the present invention, a positive electrode including the positive electrode active material is provided.

Still further, according to another embodiment of the present invention, a lithium secondary battery including the positive electrode, a battery module, and a battery pack are provided.

Other specific features of embodiments of the present invention are included in the following detailed description.

Advantageous Effects

In a positive electrode active material for a secondary battery according to the present invention, a surface treatment layer including a porous coordination polymer is formed on a core including a lithium composite metal oxide, and thus lifetime properties and high-temperature stability may be enhanced when the positive electrode active material is applied to a battery. Accordingly, the positive electrode active material according to the present invention may be useful in batteries, such as batteries for vehicles or batteries for power tools, requiring excellent lifetime properties and high-temperature stability, in particular, batteries for vehicles.

MODE FOR CARRYING OUT THE INVENTION

Hereinafter, the present invention is described in greater detail to facilitate understanding of the present invention.

Terms and words used herein and in the claims should not be construed as being limited to their typical or dictionary definitions. Rather, the terms and words are to be understood as having meanings and concepts that accord with the technical concept of the present invention, based on the principle wherein the inventor can appropriately define the concepts of terms in order to describe his or her invention as best as possible A positive electrode active material for a secondary battery according to an embodiment of the present invention includes:

a core including a lithium composite metal oxide, and a surface treatment layer positioned on the surface of the core, wherein the surface treatment layer includes a porous coordination polymer in which a central metal ion is coordinate-bonded with an organic ligand.

Specifically, the porous coordination polymer, which is a compound called a porous organic-inorganic hybrid or a metal-organic framework, is a molecular sieve, which has unsaturated metal sites due to the substitution of metals and has fine pores. Moreover, the porous coordination polymer includes both organic material and inorganic material in a frame structure, and is a crystalline compound having a molecule-sized or nano-sized fine pore structure.

More specifically, the porous coordination polymer may be used without limit if the porous coordination polymer does not lower battery efficiency when utilized in a battery, and is one in which a central metal (M) is capable of forming a coordination compound. Specifically, the central metal (M) may be an alkali earth metal such as Mg or Ca; a transition metal such as Zr, Ti, Ni, Mn, Co, V, Nb, Ta, Mo, or W; a post-transition metal such as Al; or a rare earth metal such as Y or La, and may include one or an alloy of two or more thereof. More specifically, the metal element (M) may include one or an alloy of two or more selected from the group consisting of Mg, Zr, Ti, Ni, Mn, Co, Al, and V, and more specifically, may include one or an alloy of two or more selected from the group consisting of Zr, Ti, and Al.

Moreover, in the porous coordination polymer, an organic ligand (L) may be used without limit if the organic ligand has a coordinatable functional group. Specifically, the organic ligand (L) may be a carboxylic acid group (—$CH_3COOH$), a carboxylate anion group (—$CH_3COO^-$), an amino group (—$NH_2$), an imino group, an amide group (—$CONH_2$), a sulfonic acid group (—$SO_3H$), a sulfonate anion group (—$SO_3^-$), a methanedithioic acid group (—$CS_2H$), a methanedithioate anion group (—$CS_2^-$), a pyridine group, or a pyrazine group and the like, and may be a compound including one or a combined group of two or more thereof. In addition, the organic ligand (L) may also be a bidentate or tridentate ligand that can further enhance the stability of the porous coordination polymer.

More specifically, a neutral organic material such as bipyridine or pyrazine; or an anionic organic material, for instance a carboxylate anion such as a terephthalate, a naphthalenedicarboxylate, a benzenetricarboxylate, a glutalate, or a succinate may be used as the organic ligand. Moreover, in the case of the carboxylate anion, a compound having an aromatic ring, such as a terephthalate, an anionic compound of a linear carboxylic acid, such as formate, an anionic compound having a non-aromatic ring, such as cyclohexyl dicarbonate, may be used. Furthermore, an organic material having a coordinatable site obviously has a potential coordination site, and thus one may be used which, when reacted, is transformed to be coordinatable. For example, when using an organic acid such as terephthalic acid, the terephthalic acid may, after the reaction, be transformed into terephthalate and bond with a metal component. More specifically, the complexing group may include an organic acid, such as benzenedicarboxylic acid, naphthalenedicarboxylic acid, benzenetricarboxylic acid, naphthalenetricarboxylic acid, pyridinedicarboxylic acid, bipyridyl dicarboxylic acid, formic acid, oxalic acid, malonic acid, succinic acid, glutaric acid, hexanedioic acid, heptanedioic acid, or cyclohexyl dicarboxylic acid, and anions thereof, pyrazine, bipyridine, etc., and one or a mixture of two or more thereof may be used.

More specifically, the organic ligand may include one or a compound of two or more selected from the group consisting of benzenedicarboxylic acid, naphthalenedicarboxylic acid, benzenetricarboxylic acid, naphthalenetricarboxylic acid, pyridinedicarboxylic acid, bipyridyl dicarboxylic acid, formic acid, oxalic acid, malonic acid, succinic acid, glutaric acid, hexanedioic acid, heptanedioic acid, cyclohexyl dicarboxylic acid, pyrazine, and bipyridine.

More specifically, the porous coordination polymer may be a metal-carboxylate including one or two or more elements selected from the group consisting of Mg, Zr, Ti, Ni, Mn, Co, Al, and V, and more specifically, may be vanadium terephthalate or aluminum terephthalate and the like. Among these, when considering the magnitude of the enhancement effect on battery properties in the case of adoption in a positive electrode active material, the porous coordination polymer may be one having a MIL-53(Al) structure In addition, the porous coordination polymer may include molecule-sized or nano-sized pores, and specifically, may have an average pore size of 2 to 50 nm. As a consequence of having such an average pore size, the material resistance in the surface treatment layer may be reduced, and thus a better output property improvement effect may be exhibited.

In the present invention, a porosimetry analyzer (Bell Japan Inc, Belsorp-II mini) may be used to measure the average pore size in a positive electrode active material layer and a conductive material layer by a nitrogen gas adsorption-flow method using a BET six-point method.

Moreover, the porous coordination polymer, due to the pore structure, exhibits a large specific surface area. Specifically, the porous coordination polymer may be one having a BET specific surface area of 800 to 1200 m²/g. As a result of having a specific surface area in such a range, superior battery property improvement effects may be exhibited.

In the present invention, the specific surface area was measured by the BET (Brunauer-Emmett-Teller) technique, and specifically, may be derived from the nitrogen gas adsorption amount under liquid nitrogen temperatures (77 K) using BEL Japan's BELSORP-mino II.

The porous coordination polymer such as above may be prepared according to a typical method, and specifically, may be prepared by mixing and then heating a metal raw material, an organic material capable of acting as a ligand, and a solvent. Here, the heating operation may be performed by an electrical heating method, micro-irradiation, or ultrasonic irradiation and the like.

In addition, the solvent may include water, an alcohol such as methanol, ethanol, or propanol; a ketone such as acetone or methyl ethyl ketone; a hydrocarbon compound such as hexane, heptane, or octane; or an amide such as dimethylformamide (DMF), and one or a mixture of two or more thereof may be used.

The porous coordination polymer may be included at a content of 100 to 20,000 ppm with respect to the total weight of a positive electrode active material. When the porous coordination polymer is included at the above content, increased electrode density due to the inclusion of the porous coordination polymer may enhance output properties when the porous coordination polymer is applied to a battery.

Moreover, a surface treatment layer including the porous coordination polymer such as above may be formed on the entire surface of a core, and may also be formed on a portion thereof. Specifically, when the surface treatment layer is formed on a portion of the core, the surface treatment layer may be formed on a surface area of at least 25 area % and less than 100 area % of the total surface area of the core. When the surface treatment layer formation area is less than 25 area %, the improvement effect due to the formation of the surface treatment layer is insignificant. More specifically, the surface treatment layer may be formed on a surface area of 25 to 99 area %.

Furthermore, when the surface treatment layer is formed on portions of the core, a plurality of locally formed surface treatment layers may be present on the surface of the core.

In addition, it is desirable for the surface treatment layer to be formed to an appropriate thickness in consideration of the core particle diameter, which determines the capacity of the positive electrode active material. Specifically, the surface treatment layer may be formed to an average thickness ratio of 0.01 to 0.1 with respect to the radius of the core. When the thickness ratio of the surface treatment layer is less than 0.01, the improvement effect due to a first surface treatment layer may be insignificant, and when the thickness ratio is greater than 0.1, there is a concern that the resistance to lithium ions passing through the first surface treatment layer may increase.

In the present invention, the particle diameter of the core and the thickness of the surface treatment layer may be measured through particle cross-sectional analysis using a forced ion beam (fib).

Meanwhile, in the positive electrode active material according to an embodiment of the present invention, a particle of the lithium composite metal oxide includes a high content of nickel, and specifically, a high content of at least 80 at % may be included with respect to the total atomic weight of non-lithium metal elements present in the oxide, such that high discharge capacity properties are exhibited.

More specifically, the lithium composite metal oxide particle may include a compound of Formula 1 below:

$$Li_aNi_{1-x-y}Co_xM1_yM2_wO_2 \quad \text{[Formula 1]}$$

In Formula 1,
1.0≤a≤1.5, 0≤x≤0.2, 0≤y≤0.2, 0≤w≤0.1, and 0≤x+y≤0.2, and more specifically, 1.0≤a≤1.2, 0<x≤0.2, 0<y≤0.2, 0≤w≤0.1, and 0<x+y≤0.2; M1 may include one or both selected from the group consisting of Mn and Al; and M2 may include one or two or more elements selected from the group consisting of Ba, Ca, Zr, Ti, Mg, Ta, Nb, and Mo.

The composition of the lithium composite metal oxide of Formula 1 is an average composition of the entire active material.

When having the composition of Formula 1, excellent structural stability along with superior capacity properties may be exhibited.

Specifically, in the lithium composite metal oxide of Formula 1, Li may be included at a content corresponding to a, that is, 1.0≤a≤1.5. When a is less than 1.0, there is a concern that capacity may decrease, and when greater than 1.5, the particles may become sintered in a firing operation, and thus active material preparation may be difficult. More specifically, when considering the balance between the significance of the capacity properties improvement effect in the positive electrode active material and the tendency for sintering to occur during preparation of the active material, which depend on control of the Li content, the Li may be included at a content of 1.0≤a≤1.15.

In addition, in the lithium transition metal oxide of Formula 1, Ni may be included at a content corresponding to 1−x−y, that is, 0.8≤1−x−y≤1. When 1−x−y is below 0.8, there is a concern that capacity properties may degrade, and when greater than 1, there is a concern that high temperature stability may degrade. When considering the significance of the capacity properties improvement effect due to the inclusion of Ni, more specifically, the Ni may be included at a content of 0.8≤1−x−y≤1, and even more specifically, 0.8≤1−x−y<0.95.

Moreover, in the lithium composite metal oxide of Formula 1, M1 may be at least one selected from the group consisting of Al and Mn, and more specifically, may be Al or Mn. M1 may be included at a content corresponding to y, that is, 0≤y≤0.2. When y is greater than 0.2, there is a concern that the output properties and capacity properties of the battery may actually decrease instead. When considering the significance of the battery properties improvement effect due to the inclusion of the M1 element, more specifically, the Ni may be included at a content of 0<y≤0.2, and even more specifically, 0.05≤y≤0.2.

Furthermore, the elements Ni, Co, and M1 in the lithium composite metal oxide of Formula 1, in order to improve battery properties through adjustment of the distribution of metal elements in the active material, may also be partially substituted or doped with another element, that is, M2. The M2 may be one or two or more elements selected from the group consisting of Ba, Ca, Zr, Ti, Mg, Ta, Nb, and Mo, and more specifically, may be Zr or Ti. The element M2 may be included in an amount corresponding to w, within a range that does not degrade the properties of the positive electrode active material, that is, a content of $0 \leq w \leq 0.02$.

Specifically, in a positive electrode active material according to an embodiment of the present invention, at least one metal element among nickel, cobalt, and M1 may have a concentration gradient in which the concentration of metal gradually changes throughout the whole of an active material particle, and the slope of the concentration gradient of the metal element may exhibit at least one value. Specifically, nickel, cobalt, and M1 included in the positive electrode active material may be distributed such that the average slope of the concentration profile, from the center of the particle to the particle surface, or in each of the core and shell, is positive (+) or negative (−). Due to having a continuous concentration gradient in this manner, abrupt phase boundary regions are not present in the particle from the center to the surface, and thus the crystal structure is stabilized and thermal stability is increased. Moreover, when the slope of the metal concentration gradient is constant, the structural stability improvement effect may be enhanced further. Furthermore, by varying the concentration of each metal in the active material particle through the concentration gradient, the properties of the relevant metal may be usefully utilized to further enhance the battery performance improvement effect of the positive electrode active material.

In the present invention, when the X-axis indicates the depth from the particle surface to the center and the Y-axis indicates the content of a metal element, the concentration gradient or concentration profile of the metal element indicates a graph showing the content of the metal element according to the depth from the particle surface to the center. For example, a positive average slope of the concentration gradient indicates that more of the specific metal element is located in a center section of the particle than in a particle surface portion, and a negative average slope indicates that more of the metal element is located in the surface portion than in the particle center section. In the present invention, the concentration gradient and concentration profile of the metal in the active material may be confirmed using a method such as x-ray photoelectron spectroscopy (XPS, also known as electron spectroscopy for chemical analysis (ESCA)), electron probe micro analyzer (EPMA), inductively coupled plasma-atomic emission spectrometer (ICP-AES), or time of flight secondary ion mass spectrometry (ToF-SIMS) and the like, and specifically, when the metal element profile in the active material is confirmed using XPS, the metal element ratio (atomic ratio) may be measured at each etching time while etching (etching time) the active material in the direction from the particle surface to the center.

More specifically, at least in one particle among the lithium composite metal oxide particles, nickel may have a continuous concentration gradient and decrease in the direction from the center of the active material particle to the particle surface. Here, the slope of the nickel concentration gradient may be constant from the center to the surface of the active material particle. Thus, when the nickel concentration is maintained at a high concentration in the particle center of the active material particle and includes a concentration gradient in which the concentration decreases going towards the particle surface, thermal stability is exhibited and capacity decrease may be prevented.

Moreover, in a positive electrode active material according to an embodiment of the present invention, the concentration of cobalt included in the positive electrode active material may have a continuous concentration gradient and increase in the direction from the center of the active material particle to the particle surface; or independently in each of the core and the shell, the concentration may have a continuous concentration gradient and increase in the direction from the center of the particle to the surface of the particle. Here, the slope of the cobalt concentration gradient may be constant from the center to the surface of the positive electrode active material particle, or in each of the core and shell. Thus, when the cobalt concentration is maintained at a low concentration in the particle center of the active material particle and a concentration gradient in which the concentration increases going towards the surface region is included, capacity decrease may be prevented while decreasing the amount of cobalt that is used.

Furthermore, in the positive electrode active material according to an embodiment of the present invention, the concentration of M1 included in the positive electrode active material may have a continuous concentration gradient and increase in the direction from the center of the active material particle to the particle surface; or independently in each of the core and the shell, the concentration may have a continuous concentration gradient and increase in the direction going from the center of the active material particle to the surface of the particle. Here, the slope of the M1 concentration gradient may be constant from the center to the surface of the positive electrode active material particle, or in each of the core and the shell. Thus, when the M1 concentration is maintained at a low concentration in the particle center of the active material particle and a concentration gradient in which the concentration increases going toward the surface region is included, thermal stability may be improved without a decrease in capacity. More specifically, M1 may be manganese (Mn).

In addition, in the positive electrode active material according to an embodiment of the present invention, nickel, cobalt, and M1 may each independently exhibit a concentration gradient that continuously varies throughout the whole of the particle, the nickel concentration may have a continuous concentration gradient and decrease in the direction from the center to the surface of the active material particle, and the concentrations of the cobalt and M1 may each independently have a continuous concentration gradient and increase in the direction from the center to the surface of the active material particle. Thus, a combined concentration gradient, in which over portions or the whole of the active material, the concentration of nickel decreases and the concentrations of cobalt and M1 increase going towards the surface of the particle, may be included such that thermal stability may be exhibited while capacity properties are maintained.

Moreover, in the positive electrode active material according to an embodiment of the present invention, when a lithium composite metal oxide is doped or substituted with the element M2, the doping amount may be higher toward the surface region of the particle. Specifically, the concentration difference of the dopant element between the center and surface of the particle may be 10 to 70 at %. Thus, when the dopant element content difference in the lithium composite metal oxide particle is within the above range, the thermal stability of the particle itself is further enhanced, and consequently, lifetime properties may be improved.

In the present invention, the 'interior' of the particle exists inside the particle and indicates the region which excludes the surface of the particle and is near the particle center. Specifically, the 'interior' indicates the region corresponding to a distance which is at least 0% and less than 100%, more specifically at least 0% and at most 70%, of the distance (rin) from the center to the surface of the particle, that is, the radius of the particle from the center. Moreover, in the present invention, the particle 'surface region' indicates the region which excludes the center of the particle or the interior of the particle, and is near the surface, specifically, the region corresponding to a distance which is at least 0% and less than 100%, more specifically at least 0% and at most 30% of the distance (rsur) from the surface to the center of the first particle, that is, the radius of the particle from the surface.

Moreover, in the present invention, the variation in dopant element content in the surface and interior of the particle may be measured according to typical methods, and specifically, the content of dopant elements present at the surface may be measured using X-ray photoelectron spectroscopy (XPS), transmission electron microscopy (TEM), or energy dispersive x-ray spectroscopy, (EDS).

The positive electrode active material according to an embodiment of the present invention may have an average particle size (D50) of 3 to 20 μm. By using a positive electrode active material having such an optimized average particle size, the weight capacity density may be enhanced when manufacturing a positive electrode.

In the present invention, the average particle size ($D_{50}$) of the positive electrode active material may be defined as the particle size at 50% of the particle size distribution. The average particle size (D50) of the positive electrode active material according to an embodiment of the present invention may be measured using, for example, a laser diffraction method. For example, after dispersing the positive electrode active material in a dispersion medium, a commercially sold laser diffraction particle size analyzer (for example, Microtrac MT 3000) may be used to emit approximately 28 kHz ultrasonic waves at 60 W output, and the average particle size ($D_{50}$) at 50% of the particle size distribution according to the analyzer may be derived.

The positive electrode active material according to an embodiment of the present invention may have a tap density of at least 1.7 g/cc, or 1.7 to 2.5 g/cc. By having a high density in this range, high capacity properties may be exhibited. In the present invention, the tap density of the positive electrode active material may be measured using a typical tap density analyzer, and specifically, may be measured using a tap density tester.

The positive electrode active material according to an embodiment of the present invention may be prepared by the step of forming a surface treatment layer on the surface of a core by mixing and then heat treating a core, including a lithium composite metal oxide, and the porous coordination polymer compound; or the step of forming a surface treatment layer on the surface of a core through self-assembly of a ligand compound and a metal raw material, following mixing of the core with the ligand compound and metal raw material in a solvent.

Specifically, when a porous coordination polymer compound is used to prepare the positive electrode active material, the positive electrode active material may be prepared by wet-mixing or dry-mixing of the core, including the lithium composite metal oxide, and the porous coordination polymer compound.

In the case of the wet-mixing, a mixing operation may be performed in an amide solvent such as n,n-dimethyl formamide, n,n-dimethyl acetamide, formamide, or acetamide and the like. Moreover, the heat treatment following the wet-mixing may be performed in a temperature range of 200 to 300° C.

In addition, dry-mixing may be performed at a temperature of at most 300° C., after mixing a particulate core, including a lithium composite metal oxide, and the porous coordination polymer compound.

The mixing operation of a core, including a lithium composite metal oxide, and a porous coordination polymer is not particularly limited, and may be performed, according to typical methods, by using wet or dry-mixing methods. In addition, a mixing device, such as a ball mill and the like, may be used, as necessary, for uniform mixing.

Meanwhile, when preparation involves the use of a raw material for forming the porous coordination polymer compound, the preparation may be performed by dissolving and then reacting the core, and a ligand compound and a metal raw material, in a solvent. In this case, the porous coordination polymer compound is formed on the surface of the core through self-assembly of the ligand compound and the metal raw material.

Here, a ligand-providing raw material described above, such as a hydroxide compound; or a carboxylate compound such as 1,4-benzenedicarboxylate and the like may be used as the ligand compound.

Moreover, a complex salt which forms a porous coordination polymer and contains a central metal (M) may be used as the metal raw material. For example, when the central metal is aluminum, the metal raw material may be aluminum acetate or aluminum hydroxide ($Al(OH)_3$)) and the like, and one or a mixture of two or more thereof may be used.

Furthermore, for the solvent, one capable of dissolving the ligand compound and metal raw material described above, such as an amide solvent such as dimethylformamide and the like, may be used without particular limit.

The amounts of the above reactants used may be determined according to the porous coordination polymer content of the active material to be ultimately prepared.

In addition, after the reaction between the ligand compound and the metal raw material, heat treatment may selectively be further performed. The heat treatment is for evaporating and removing the solvent used, and may be performed at a temperature of at most 300° C.

According to another embodiment of the present invention, a positive electrode including the positive electrode active material described above is provided.

Specifically, the positive electrode includes a positive electrode current collector and a positive electrode active material layer, which is formed on the positive electrode current collector and includes the positive electrode active material described above.

The positive electrode current collector is not particularly limited if the positive electrode current collector is one which has conductivity but does not cause chemical changes to a battery, and for example, stainless steel, aluminum, nickel, titanium, baked carbon, or aluminum, or stainless steel, of which the surface has been surface treated with carbon, nickel, titanium, silver and the like, may be used. Moreover, the positive electrode current collector may typically have a thickness of 3 to 500 μm, and small hills and valleys may also be formed on the surface of the current collector to increase the adhesiveness of the positive electrode active material. The positive electrode current collector may be used in various forms, for example, a film, a sheet, a foil, a net, a porous body, a foam body, or a non-woven fabric body and the like.

Moreover, the positive electrode active material layer may include, along with the positive electrode active material, a conductive material and a binder.

Here, the conductive material may be used without limit if the conductive material is one which is used for imparting conductivity to an electrode and does not cause chemical changes in a configured battery. Specific examples are graphites such as natural graphite or synthetic graphite; carbon-based materials such as carbon black, acetylene black, Ketjen black, channel black, furnace black, lamp black, thermal black, or carbon fiber and the like; metal powders or metal fibers of copper, nickel, aluminum, or silver and the like; conductive whiskers such as zinc oxide or potassium titanate and the like; conductive metal oxides such as titanium oxide and the like; or conductive polymers such as polyphenylene derivatives and the like, and one thereof by itself or a mixture of two or more thereof may be used. Typically, 1 to 30 wt % of the conductive material may be included with respect to the total weight of the positive electrode active material layer.

In addition, the binder performs the role of enhancing the adhesion between positive electrode active material particles and between the positive electrode active material and the current collector. Specific examples may include polyvinylidene fluoride (PVDF), vinylidene fluoride hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated EPDM, styrene butadiene rubber (SBR), fluororubber, or various copolymers thereof, and one thereof by itself or a mixture of two or more thereof may be used. 1 to 30 wt % of the binder may be included with respect to the total weight of the positive electrode active material layer.

The positive electrode may be manufacture according to a positive electrode manufacturing method which is typical apart from the use of the positive electrode active material described above. Specifically, the positive electrode may be manufactured by applying a composition, which is for forming the positive electrode active material layer and includes the positive electrode active material and, selectively, the binder and conductive material, on the positive electrode current collector, and then drying and rolling. Here, the kinds and contents of the positive electrode active material, the binder, and the conductive material are as described above.

The solvent may be a solvent that is typically used in the art, and may be dimethyl sulfoxide (DMSO), isopropyl alcohol, n-methylpyrrolidone (NMP), acetone, or water and the like, and one thereof by itself, or a mixture of two or more thereof may be used. The amount of the solvent used is sufficient if, considering the coating thickness of the slurry and manufacturing yield, the amount is sufficient for dissolving or dispersing the positive electrode active material, conductive material, and binder, and then, when applied to manufacture the positive electrode, provides a level of viscosity that can exhibit excellent thickness uniformity.

In addition, in another method, the positive electrode may also be manufactured by casting on a separate support, the composition for forming the positive electrode active material layer, and then laminating on the positive electrode current collector, a film obtained by being peeled from the support.

According to still another embodiment of the present invention, an electrochemical element including the positive electrode is provided. The electrochemical element may specifically be a battery or a capacitor and the like, and more specifically, may be a lithium secondary battery.

The lithium secondary battery specifically includes a positive electrode, a negative electrode positioned facing the positive electrode, a separator interposed between the positive electrode and negative electrode, and an electrolyte, and the positive electrode is as described above. Moreover, the lithium secondary battery may selectively further include a battery container that stores a battery assembly of the separator, and a sealing member that seals the battery container.

In the lithium secondary battery, the negative electrode includes a negative electrode current collector and a negative electrode active material positioned on the negative electrode current collector.

The negative electrode current collector is not particularly limited if the negative electrode current collector is highly conductive and does not cause chemical changes to the battery, and for example, copper, stainless steel, aluminum, nickel, titanium, baked carbon, copper, or stainless steel, of which the surface has been surface treated with carbon, nickel, titanium, or silver and the like, or an aluminum-cadmium alloy and the like may be used. Moreover, the negative electrode current collector may typically have a thickness of 3 to 500 μm and, as in the case of the positive electrode current collector, small hills and valleys may also be formed on the surface of the current collector to increase the adhesiveness of the negative electrode active material. The negative electrode current collector may be used in various forms, for example, a film, a sheet, a foil, a net, a porous body, a foam body, or a non-woven fabric body and the like.

The negative electrode active material layer may selectively include, along with the negative electrode active material, a binder and a conductive material. The negative electrode active material layer may, for example, be prepared by applying and drying on the negative electrode current collector, a composition which is for forming a negative electrode and includes the negative electrode active material and, selectively, the binder and the conductive material, or may also be prepared by casting on a separate support, the composition for forming a negative electrode, and then laminating on the negative electrode current collector, a film obtained by being peeled from the support.

A compound capable of reversible intercalation and deintercalation of lithium may be used as the negative electrode active material. Specific examples may include carbonaceous materials such as synthetic graphite, natural graphite, graphitized carbon fiber, or amorphous carbon and the like; metallic compounds capable of alloying with lithium such as Si, Al, Sn, Pb, Zn, Bi, In, Mg, Ga, Cd, Si alloys, Sn alloys, or Al alloys and the like; metal oxides capable of doping and dedoping lithium, such as $SiO_x$ ($0<x<2$), $SnO_2$, vanadium oxide, or lithium vanadium oxide and the like; or composite materials including the metallic compound and carbonaceous material, such as an Si—C composite or Sn—C composite and the like, and one thereof or a mixture of two or more thereof may be used. In addition, a metal lithium thin film may also be used as the negative electrode active material. Moreover, low-crystallinity carbon and high-crystallinity carbon and the like may all be used as a carbon material. Soft carbon and hard carbon are representative of low-crystallinity carbon, while high-temperature baked carbon such as amorphous, plate, flake, spherical, or fiber-type natural or synthetic graphite, Kish graphite, pyrolytic carbon, mesophase pitch based carbon fiber, meso-carbon microbeads, mesophase pitches, and petroleum or coal tar pitch derived cokes and the like are representative of high-crystallinity carbon.

Furthermore, the binder and conductive material may be the same as those described above with respect to the positive electrode.

Meanwhile, in the lithium secondary battery, a separator, which is for separating the negative electrode and the positive electrode and providing a transport path for lithium ions, and which is typically used as a separator in lithium secondary batteries, may be used without particular limit, and in particular, one with low resistance with respect to the movement of ions in the electrolyte and also having an excellent ability to retain an electrolyte solution, is desirable. Specifically, a porous polymer film, for example, a porous polymer film prepared using a polyolefin-based polymer, such as an ethylene homopolymer, a propylene homopolymer, an ethylene/butene copolymer, an ethylene/hexene copolymer, and an ethylene/methacrylate copolymer and the like, or a laminated structure of two layers or more thereof may be used. Moreover, a typical porous non-woven fabric, for example, a non-woven fabric composed of high-melting point glass fiber or polyethylene terephthalate fiber and the like may also be used. Furthermore, in order to achieve heat resistance or mechanical strength, a coated separator that includes a ceramic material or polymer material may also be used, and may be selectively used as a single layer or multilayer structure.

In addition, the electrolyte used in the present invention may be an organic liquid electrolyte, an inorganic liquid electrolyte, a solid polymer electrolyte, a gel-type polymer electrolyte, a solid inorganic electrolyte, or a melting-type inorganic electrolyte and the like, which can be used when manufacturing a lithium secondary battery, but is not limited thereto.

Specifically, the electrolyte may include an organic solvent and a lithium salt.

The organic solvent may be used without particular limit if the organic solvent can perform the role of a medium in which ions involved in electrochemical reactions in the battery may move. Specifically, an ester-based solvent such as methyl acetate, ethyl acetate, γ-butyrolactone, or ε-caprolactone and the like; an ether-based solvent such as dibutyl ether or tetrahydrofuran and the like; a ketone-based solvent such as cyclohexanone and the like; an aromatic hydrocarbon-based solvent such as benzene or fluorobenzene and the like; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC) and the like; an alcohol-based solvent such as ethyl alcohol or isopropyl alcohol and the like; a nitrile such as R—CN (where R is a C2 to C20 hydrocarbon group having a linear, branched, or cyclic structure, and may include a double bond aromatic ring or ether bond) and the like; an amide such as dimethylformamide and the like; a dioxolane such as 1,3-dioxolane and the like; or a sulfolane and the like may be used as the organic solvent. Among these, the carbonate-based solvents are desirable, and a mixture of cyclic carbonates (for example, ethylene carbonate or propylene carbonate and the like) and low-viscosity, linear carbonate-based compounds (for example, ethyl methyl carbonate, dimethyl carbonate, or diethyl carbonate and the like), which can increase battery charge-discharge performance and have high ionic conductivity and high permittivity, is still more desirable. In this case, excellent performance in the electrolyte solution may be obtained by mixing and thereby using a cyclic carbonate and a chain carbonate in a volume ratio of about 1:1 to about 1:9.

The lithium salt may be used without particular limit if the lithium salt is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ and the like may be used as the lithium salt. The lithium salt is desirably used in a concentration in the range of 0.1 to 2.0 M. When the concentration of the lithium salt is included in the above range, the electrolyte has an appropriate conductivity and viscosity, and thus may exhibit excellent electrolyte performance, and lithium ions may move effectively.

In addition to the above components of the electrolyte, the electrolyte may also further include at least one additive for enhancing the lifetime properties of the battery, suppressing battery capacity reduction, or enhancing battery discharge capacity and the like, such as a haloalkylene carbonate-based compound such as difluoroethylene carbonate, pyridine, triethyl phosphite, triethanolamine, a cyclic ether, ethylenediamine, n-glyme, hexaphosphoric triamide, a nitrobenzene derivative, sulfur, quinoneimine dye, n-substituted oxazolidinone, n,n-substituted imidazolidine, ethylene glycol dialkyl ether, ammonium salt, pyrrole, 2-methoxyethanol, or aluminum trichloride and the like. Here, 0.1 to 5 wt % of the additive may be included with respect to the total weight of the electrolyte.

Since, as above, a lithium secondary battery including a positive electrode active material according to the present invention reliably exhibits excellent discharge capacity, output properties, and capacity retention ratio, the lithium secondary battery is useful in mobile devices such as mobile phones, notebook computers, and digital cameras and the like, and in the field of electric vehicles, such as hybrid electric vehicles (HEV) and the like.

Thus, according to another embodiment of the present invention, a battery module including the lithium secondary battery as a unit cell, and a battery pack including the same are provided.

The battery module or battery pack may be used as a power source for at least one mid or large-sized device among a power tool; an electric car including an electric vehicle (EV), a hybrid electric vehicle, and a plugin hybrid electric vehicle (PHEV); or a power storage system.

Hereinafter, examples of the present invention are described in detail in such a way as to be easily performed by a person skilled in the art. However, the prevent invention may be embodied in many different forms, and is not limited to the examples described herein.

EXAMPLE 1

Preparation of Positive Electrode Active Material

A positive electrode active material was prepared by mixing 2 parts by weight of 1,4-benzenedicarboxylate, as a ligand compound, and 2 parts by weight of $Al(OH)_3$, as a metal raw material, with 100 parts by weight of $Li(Ni_{0.85}Co_{0.1}Mn_{0.05})_{0.97}Zr_{0.03}O_2$ ($D_{50}$=5 μm) in dimethylformamide (DMF) and then heat treating at a temperature of 130° C. for 30 minutes.

COMPARATIVE EXAMPLE 1

Preparation of Positive Electrode Active Material

A $Li(Ni_{0.85}Co_{0.1}Mn_{0.05})_{0.97}Zr_{0.03}O_2$ ($D_{50}$=5 µm) was used, which does not form a surface treatment layer.

MANUFACTURING EXAMPLE

Manufacturing of Lithium Secondary Battery

Lithium secondary batteries were manufactured using the positive electrode active materials prepared in Example 1 and Comparative Example 1, respectively.

In detail, the positive electrode active materials respectively prepared in Example 1 and Comparative Example 1, a carbon black conductive material, and a PVdF binder were mixed in n-methylpyrrolidone solvent in a 90:5:5 ratio by weight to prepare a composition (viscosity: 5000 mPa·s) for forming a positive electrode, and the composition was applied to an aluminum current collector and then dried and rolled to manufacture a positive electrode.

Moreover, mesocarbon microbead (MCMB)—a synthetic graphite—as a negative electrode active material, a carbon black conductive material, and a PVdF binder were mixed in n-methylpyrrolidone solvent in a 85:10:5 ratio by weight to prepare a composition for forming a negative electrode, and the composition was applied to a copper current collector to manufacture a negative electrode.

An electrode assembly was manufactured by interposing a separation film of porous polyethylene between the positive electrode and negative electrode manufactured as above, and after positioning the electrode assembly inside a case, an electrolyte solution was injected into the case to manufacture a lithium secondary battery. Here, the electrolyte solution was prepared by dissolving 1.15 M concentration of lithium hexafluorophosphate ($LiPF_6$) in an organic solvent composed of ethylene carbonate/dimethyl carbonate/ethyl methyl carbonate (mixed volume ratio of EC/DMC/EMC=3/4/3).

EXPERIMENTAL EXAMPLE 1

Evaluation of Positive Electrode Active Material

Scanning electron microscopy (SEM) and BET were used on the positive electrode active material prepared in Example 1 to confirm the formation of a surface treatment layer.

As a result, it was confirmed that a surface treatment layer including, with respect to the total weight of the positive electrode active material, 20,000 ppm of crystalline MIL-53(Al) having an average pore size of 30 nm and a specific surface area of 800 $m^2/g$ was formed to an average thickness of 500 nm on 60 area % of the total surface area of the core.

EXPERIMENTAL EXAMPLE 2

Evaluation of Electrode Density

After rolling was performed by using a rolling mill to apply a 2000 kg·f force on each of the positive electrodes manufactured according to the Preparation Example using the positive electrode active materials prepared in Example 1 and Comparative Example 1, thickness and electrode weight were measured, and maximum electrode density was evaluated therefrom. The results are displayed in Table 1 below.

TABLE 1

|  | Maximum electrode density (g/cc) |
| --- | --- |
| Example 1 | 3.6 |
| Comparative Example 1 | 3.2 |

EXPERIMENTAL EXAMPLE 3

Evaluation of Battery Properties

Each of the lithium secondary batteries manufactured according to the Preparation Example using the positive electrode active materials prepared in Example 1 and Comparative Example 1 was subjected to 300 charge/discharge cycles at room temperature (25° C.) under conditions of 0.5 C/0.5 C within a driving voltage range of 4.25 V, and capacity retention ratio was measured. The results are displayed in Table 2 below.

TABLE 2

|  | Capacity retention ratio at 300th cycle (%) |
| --- | --- |
| Example 1 | 85 |
| Comparative Example 1 | 70 |

The test results showed that the lithium secondary battery including the positive electrode active material of Example 1 was significantly enhanced compared to Comparative Example 1.

EXPERIMENTAL EXAMPLE 4

Evaluation of High-Temperature Storage Properties

Each of the lithium secondary batteries manufactured according to the Preparation Example using the positive electrode active materials prepared in Example 1 and Comparative Example 1 was stored for 4 weeks at 60° C. under 0.5 C discharge capacity conditions, and then evaluated for high-temperature storage properties. The results are displayed in Table 3 below.

TABLE 3

|  | High temperature storage properties (%) |
| --- | --- |
| Example 1 | 80 |
| Comparative Example 1 | 65 |

The test results showed that the lithium secondary battery including the positive electrode active material of Example 1 was significantly improved compared to Comparative Example 1, with respect also to high-temperature storage properties.

The invention claimed is:
1. A positive electrode active material for a secondary battery, the positive electrode active material comprising:
a core including a lithium composite metal oxide; and a surface treatment layer positioned on the surface of the core, wherein the surface treatment layer includes a porous coordination polymer including at least one selected from the group consisting of aluminum terephthalate and vanadium terephthalate.

2. The positive electrode active material of claim 1, wherein the porous coordination polymer has an average pore size of 2 to 50 nm.

3. The positive electrode active material of claim 1, wherein the BET specific surface area of the porous coordination polymer is 800 to 1200 m²/g.

4. The positive electrode active material of claim 1, wherein the porous coordination polymer is included at a content of 100 to 20,000 ppm with respect to the total weight of the positive electrode active material.

5. The positive electrode active material of claim 1, wherein the surface treatment layer is formed to a thickness ratio of 0.01 to 0.1 with respect to the radius of the core.

6. The positive electrode active material of claim 1, wherein the lithium composite metal oxide includes nickel at a content of at least 80 at % with respect to the total atomic weight of non-lithium metal elements present in the oxide.

7. The positive electrode active material of claim 1, wherein the lithium composite metal oxide includes the compound of Formula 1 below (in Formula 1, 1.0≤a≤1.5, 0≤x≤0.2, 0≤y≤0.2, 0≤w≤0.1, and 0≤x+y≤0.2, M1 includes one or both selected from the group consisting of Mn and Al, and M2 includes one or two or more elements selected from the group consisting of Ba, Ca, Zr, Ti, Mg, Ta, Nb, and Mo).

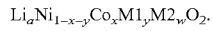

$$Li_aNi_{1-x-y}Co_xM1_yM2_wO_2.$$ [Formula 1]

8. The positive electrode active material of claim 1, wherein, in at least one particle among the lithium composite metal oxide particles, the nickel is distributed as a concentration gradient that gradually increases going from the center to the surface of the particle.

9. The positive electrode active material of claim 1, wherein the tap density is at least 1.7 g/cc.

10. A positive electrode for a secondary battery, the positive electrode comprising the positive electrode active material according to claim 1.

11. The positive electrode of claim 10, wherein the positive electrode has an electrode density of at least 3.0 g/cc.

12. A lithium secondary battery comprising the positive electrode according to claim 10.

13. A positive electrode active material for a secondary battery, the positive electrode active material comprising:
a core including a lithium composite metal oxide; and
a surface treatment layer positioned on the surface of the core, wherein the surface treatment layer includes a porous coordination polymer in which a central metal ion is coordinate-bonded with an organic ligand and has an MIL-53(Al) structure.

14. The positive electrode active material of claim 13, wherein the surface treatment layer is included in at least 25 area % and less than 100 area % of the total surface area of the core.

15. The positive electrode active material of claim 13, wherein the porous coordination polymer has an average pore size of 2 to 50 nm.

16. The positive electrode active material of claim 7, wherein the BET specific surface area of the porous coordination polymer is 800 to 1200 m²/g.

17. The positive electrode active material of claim 13, wherein the surface treatment layer is included in at least 25 area % and less than 100 area % of the total surface area of the core.

18. The positive electrode active material of claim 17, wherein the central metal includes one or two or more elements selected from the group consisting of Mg, Zr, Ti, Ni, Mn, Co, Al, and V.

19. The positive electrode active material of claim 17, wherein the organic ligand includes a compound having one or two or more functional groups selected from the group consisting of a carboxylic acid group, a carboxylate anion group, an amino group, an imino group, an amide group, a sulfonic acid group, a sulfonate anion group, a methanedithioic acid group, a methanedithioate anion group, a pyridine group, and a pyrazine group, or a mixture thereof.

20. The positive electrode active material of claim 17, wherein the organic ligand includes one or two or more compounds selected from the group consisting of benzenedicarboxylic acid, naphthalenedicarboxylic acid, benzenetricarboxylic acid, naphthalenetricarboxylic acid, pyridinedicarboxylic acid, bipyridyl dicarboxylic acid, formic acid, oxalic acid, malonic acid, succinic acid, glutaric acid, hexanedioic acid, heptanedioic acid, cyclohexyl dicarboxylic acid, pyrazine, and bipyridine.

21. The positive electrode active material of claim 17, wherein the porous coordination polymer includes a metal-carboxylate including one or two or more elements selected from the group consisting of Mg, Zr, Ti, Ni, Mn, Co, Al, and V.

22. The positive electrode active material of claim 17, wherein the porous coordination polymer is a crystalline compound.

23. The positive electrode active material of claim 17, wherein the porous coordination polymer has an average pore size of 2 to 50 nm.

24. A method for preparing the positive electrode active material according to claim 1, the method comprising:
a step for forming the surface treatment layer on the surface of the core by mixing and then heat treating the core, which includes the lithium composite metal oxide, with the porous coordination polymer; or
a step for forming the surface treatment layer on the surface of the core through self-assembly of a ligand compound and a metal raw material, following mixing of the core with the ligand compound and the metal raw material in a solvent.

25. The method of claim 24, wherein the ligand compound includes at least one selected from the group consisting of hydroxide compounds and carboxylate compounds.

26. The method of claim 24, wherein the metal raw material is an acetate compound or hydroxide compound including one or two or more central elements selected from the group consisting of Mg, Zr, Ti, Ni, Mn, Co, Al, and V.

* * * * *